US011915856B2

(12) United States Patent
Bustreo et al.

(10) Patent No.: US 11,915,856 B2
(45) Date of Patent: Feb. 27, 2024

(54) ELECTROMAGNETIC INDUCTION DEVICE HAVING A LOW LOSSES WINDING

(71) Applicant: HITACHI ENERGY LTD, Zurich (CH)

(72) Inventors: Gianluca Bustreo, Venice (IT); Roberto Zannol, Padua (IT); Rina Bortoli, Padua (IT)

(73) Assignee: HITACHI ENERGY LTD, Zürich (CH)

(*) Notice: Subject to any disclaimer, the term of this patent is extended or adjusted under 35 U.S.C. 154(b) by 625 days.

(21) Appl. No.: 16/982,420

(22) PCT Filed: Mar. 11, 2019

(86) PCT No.: PCT/EP2019/056001
§ 371 (c)(1),
(2) Date: Sep. 18, 2020

(87) PCT Pub. No.: WO2019/179808
PCT Pub. Date: Sep. 26, 2019

(65) Prior Publication Data

US 2021/0082616 A1 Mar. 18, 2021

(30) Foreign Application Priority Data

Mar. 20, 2018 (EP) .................................... 18162739

(51) Int. Cl.
*H01F 27/28* (2006.01)
*H01F 27/32* (2006.01)
(Continued)

(52) U.S. Cl.
CPC ....... *H01F 27/346* (2013.01); *H01F 27/2847* (2013.01); *H01F 27/323* (2013.01); *H01F 27/366* (2020.08); *H01F 2027/2857* (2013.01)

(58) Field of Classification Search
CPC .. H01F 27/346; H01F 27/2847; H01F 27/323; H01F 27/366; H01F 2027/2857; H01F 27/36; H01F 27/34
See application file for complete search history.

(56) References Cited

U.S. PATENT DOCUMENTS 2,490,506 A * 12/1949 Broverman ........... H01F 27/303 336/185
2,561,738 A * 7/1951 Hill ......................... H01F 27/18 62/118
(Continued)

FOREIGN PATENT DOCUMENTS

CN 2256582 Y 6/1997
CN 101091228 A 12/2007
(Continued)

OTHER PUBLICATIONS

Extended European Search Report for European Application No. 18162739.9, dated Sep. 25, 2018, 25 pages.
(Continued)

*Primary Examiner* — Tuyen T Nguyen
(74) *Attorney, Agent, or Firm* — Sage Patent Group

(57) ABSTRACT

An electromagnetic induction device comprising a magnetic core having a limb and at least one winding wound around the limb is presented. The winding comprises: an electrical conductor forming a plurality of radially overlapping layers around an axis; an electrically insulating material positioned between the radially overlapping layers of the electrical conductor; at least one magnetic material end-fill positioned at at least one axial end of the winding in electrical in contact with the layers of the electrical conductor so to be at the same electrical potential with the latter.

16 Claims, 3 Drawing Sheets

(51) Int. Cl.
*H01F 27/34* (2006.01)
*H01F 27/36* (2006.01)

(56) References Cited

U.S. PATENT DOCUMENTS

| | | | | |
|---|---|---|---|---|
| 4,012,706 | A * | 3/1977 | Westendorp | H01F 27/38 336/84 R |
| 4,060,784 | A | 11/1977 | Fergestad | |
| 4,259,654 | A | 3/1981 | Persson et al. | |
| 2011/0316662 | A1 | 12/2011 | Pregartner et al. | |

FOREIGN PATENT DOCUMENTS

| | | | | |
|---|---|---|---|---|
| CN | 201562561 | U | | 8/2010 |
| CN | 107342146 | A | | 11/2017 |
| FR | 1557420 | A | | 2/1969 |
| JP | 63211709 | A | * | 9/1988 |
| JP | 2000058332 | A | | 2/2000 |
| JP | 2000306745 | A | | 11/2000 |
| JP | 2014216524 | A | | 11/2014 |

OTHER PUBLICATIONS

Notification To Grant Patent Right for Invention for Chinese Patent Application No. 201980018950.8, dated Apr. 20, 2022, 11 pages.
Communication for European Application No. 18162739.9 dated Jun. 11, 2021, 20 pages.

* cited by examiner

ELECTROMAGNETIC INDUCTION DEVICE HAVING A LOW LOSSES WINDING

CROSS REFERENCE TO RELATED APPLICATION

This application is a 35 U.S.C. § 371 national stage application of PCT International Application No. PCT/EP2019/056001, filed on Mar. 11, 2019, the disclosure and content of which is incorporated by reference herein in its entirety.

TECHNICAL FIELD

The present invention relates to electromagnetic induction devices such as transformers.

DESCRIPTION OF THE RELATED ART

Electromagnetic induction devices, such as transformers, are used in power systems for voltage level control. In particular, a transformer is an electromagnetic induction device used to step up and step down voltage in electric power systems in order to generate, transmit and utilize electrical power. In general, a transformer comprises a core, made of e.g. laminated iron, and windings.

Foil windings, such as aluminium or copper foil windings, are particularly appreciated due to their simplicity of manufacturing, their improved transient voltage distribution and superior short circuit fault withstand-ability. However, the usage of foil windings is limited to small rating power transformer due to uneven current distribution caused by fringing of the magnetic leakage flux at the ends of the foil winding. FIG. 1 schematically shows a detail of a foil winding transformer 101 comprising a magnetic core 102 and a foil winding 103, wherein leakage flux lines 104 are indicated. In foil windings, a non-uniform current distribution usually occurs in axial direction, due to the radial leakage flux. This event is specific in foils since the skin depth is here wider for the height in comparison with the thickness. Consequently, some parts of the winding (particularly the ends and the axial gaps, if existing) are covered by an increased current density in comparison with the other foil regions. This results in high eddy losses and high temperature developments in the foil winding. The problem becomes worse with high leakage flux magnitude as the power rating increases. Even if the above problem is particularly relevant in foil windings, similar problems can however occur also in windings of different type, such as layer windings and multilayer windings.

An induction device according to the prior art is disclosed in document FR 1 557 420 A.

BRIEF SUMMARY OF THE INVENTION

The object of the present invention is therefore to provide an electromagnetic induction device, such as a foil winding transformer, wherein the undesired effects of the radial component of the leakage flux are at least partially reduced.

This and other objects achieved by an electromagnetic induction device in accordance with claim 1.

Dependent claims define possible advantageous embodiments of the invention.

BRIEF DESCRIPTION OF THE DRAWINGS

Further characteristics and advantages of the electromagnetic induction device according to the invention will be more apparent front the following description of preferred embodiments given as a way of an example with reference to the enclosed drawings in which.

DETAILED DESCRIPTION

The inventive concept will be described hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
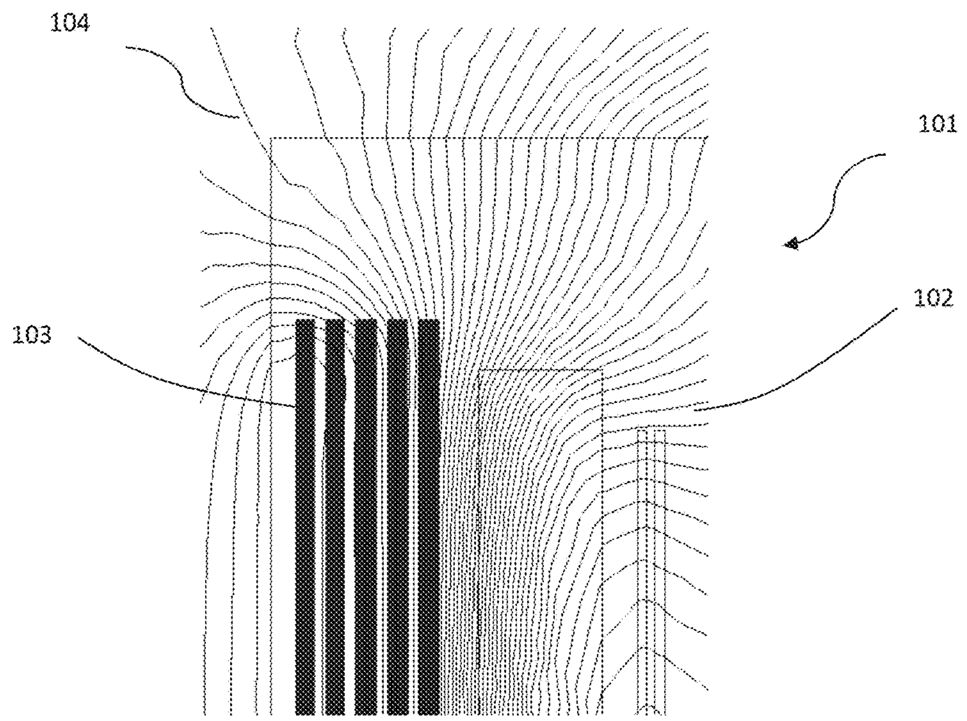
FIG. 1 (prior art)
FIG. 1 shows the leakage flux in a transformer foil winding according to the prior art.
Figure 2:
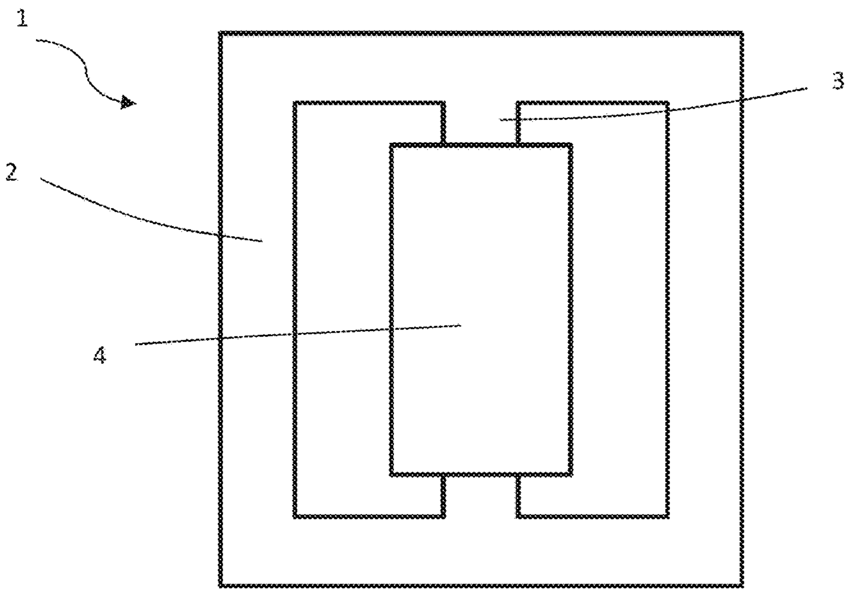
FIG. 2 is a schematic side view of an electromagnetic induction device.

With reference to the annexed FIG. 2, an electromagnetic induction device, such as a transformer, is indicated with reference 1. The electromagnetic device 1 comprises a magnetic core 2 having a limb 3 and at least one winding 4 wound around the limb 3. It is to be noted that, in the present description the winding 4 will be referred to, in a purely exemplary non-limiting manner, as a “foil winding”. However, more generally, the winding 4 can be of different type and can generally comprise a conductor forming a plurality of layers. Examples of such windings are layer windings and multilayers windings. It is further to be noted that the structure depicted in FIG. 2 is to be intended as a purely exemplary structure. For example, the core can have more or less than three limbs and the transformer can be of the single-phase type or of the multi-phase type.

Figure 3:
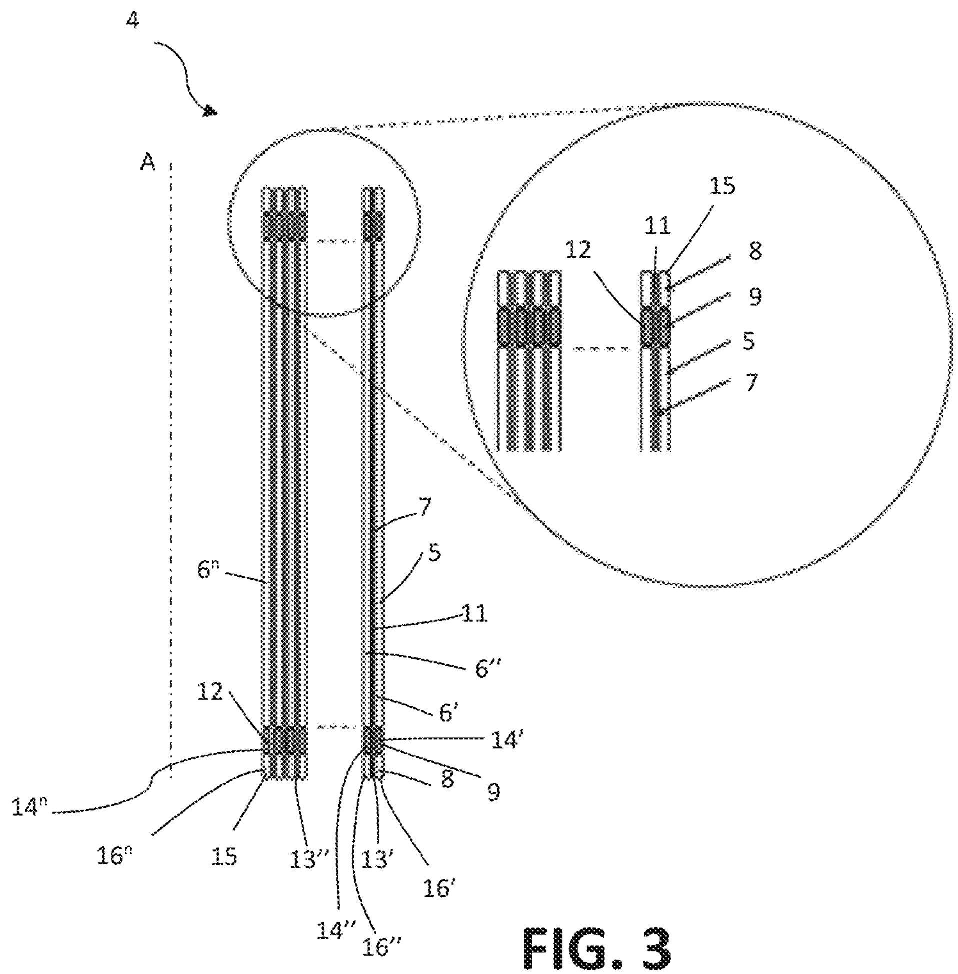
FIG. 3 is a schematic sectional view of a foil winding according to an embodiment of the invention.

Having said this, with reference to the annexed FIG. 3, a schematic sectional view of a foil winding 4 according to an embodiment is given. In the foil winding 4 an electrically conducting foil 5, e.g. made of aluminium or copper, is wound around an axis A so to form a plurality of radially overlapping layers 6', 6", . . . 6″. In order to electrically insulate the subsequent overlapping layers 6', 6", . . . 6″, an electrically insulating material 7 can be positioned between each couple of layers 6', 6", . . . 6″. For example, the electrically insulating material 7 can comprise an electrically insulating foil 11 which can be wound around the same axis A together with the electrically conducting foil 5 so to form radially overlapping layers 13', 13" . . . and to obtain the above-mentioned configuration of overlapping layers. As a consequence, in the final configuration the layers 6', 6", . . . 6″ of the electrically conducting foil 5 and the layers 13', 13" . . . of the electrically insulating foil 7 alternate in the radial direction (with reference to the axis A). For example, with reference to FIG. 3, the layer 13' of the electrically insulating foil 11 is radially positioned between the layers 6' and 6" of the electrically conducting foil 5. According to an embodiment, the electrically insulating foil 11 comprises a diamond paper foil.

The foil winding 4 comprises at least one magnetic material end-fill 9 positioned at one or both axial ends of the foil winding 4 in electrical contact with the layers 6', 6", . . . 6' formed by the electrically conducting foil 5 so to be at the same electrical potential with electrically conducting foil 5. According to a possible embodiment, the magnetic material end-fill 9 comprises at least one magnetic strip 12 wound around the axis A so to form a plurality of radially overlapping layers 14', 14", . . . 14$^n$ each corresponding to and in electrical contact with a respective layer 6', 6", . . . 6$^n$ formed by the wound electrically conducting foil 5. As a consequence, with reference to FIG. 3, the layer 14' of the magnetic strip 12 is in electrical contact with the layer 6' of the electrically conducting foil 5, the layer 14" of the magnetic strip 12 is in electrical contact with the layer 6" of the electrically conducting foil 5, and so on. Preferably, the wound magnetic strip 12 is in mechanical contact with, still more preferably is axially pressed against, the axial end of the electrically conducting foil 5, so to avoid voltage differences between the electrically conducting foil 5 and the magnetic strip 12. According to another possible embodiment, the magnetic material end-fill 9 comprises a plurality of overlapped magnetic strips so to obtain the desired thickness of each single layer 14', 14", . . . 14$^n$.

The magnetic material forming the magnetic material end-fill 9, particularly the magnetic strip 12, can be for example a grain-oriented (GO) steel, such as a steel of the type used for manufacturing the transformer cores, or a non-grain-oriented (NGO) steel, or an amorphous steel. Preferably, the magnetic material has a relative magnetic permeability greater than 400.

Preferably, the magnetic material end-fill 9, particularly the magnetic strip 12, has the same or substantially the same radial thickness of the electrically conducting foil 5.

Advantageously, the foil winding 4 comprises at least one electrically insulating material end-fill 8 positioned at one or both axial ends of the foil winding 4, such that the magnetic material end-fill 9 is axially positioned between the electrically insulating material end-fill 8 and the electrically conducting foil 5.

Preferably, the electrically insulating material end-fill 8 comprises a pressboard strip 15 wound around the axis A so to form a plurality of radially overlapping layers 16', 16", . . . 16$^n$. Still more preferably, the pressboard strip 15 is wound around the axis A together with the electrically conducting foil 5 and the magnetic strip 12 such that each layer 16', 16", . . . 16$^n$ of the pressboard strip 15 corresponds to a respective layer 14', 14", . . . 14$^n$ of the magnetic strip 12 and to a respective layer 6', 6", . . . 6$^n$ of the electrically insulating foil 5. The layers 14', 14", . . . 14$^n$ of the magnetic strip 12 are axially positioned between the layers 6', 6", . . . 6$^n$ of the electrically insulating foil 5 and the layers 16', 16", . . . 16$^n$ of the pressboard strip 15.

According to a possible embodiment, the insulating material 7, particularly the electrically insulating foil 11, is axially larger than the electrically conducting foil 5 such that each layer 13', 13" of the electrically insulating foil 11 is radially positioned between overlapping subsequent layers of the electrical conducting foil 5, of the magnetic strip 12 and of the pressboard strip 15. For example, with reference to FIG. 3, the layer 13' of the electrically insulating foil 11 is radially positioned between the layer 6' of the electrically insulating foil 5, the layer 14' of the magnetic strip 12 and the layer 16' of the pressboards strip 15 on one side, and the layer 6" of the electrically insulating foil 5, the layer 14" of the magnetic strip 12 and the layer 16" of the pressboards strip 15 on the other side. In this manner, the electrically insulating foil 11 supports the winding and electrically insulates the radially overlapping layers of the electrically conducting foil 5 and of the magnetic strip 12.

Figure 4A:
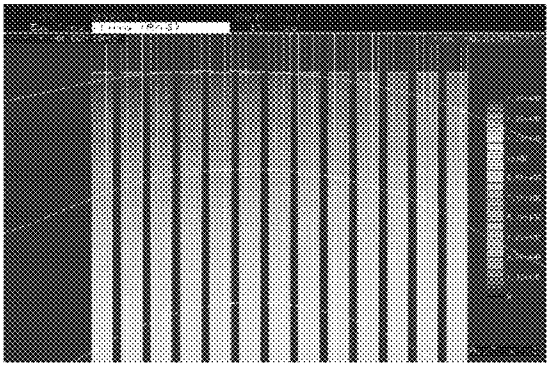
FIGS. 4*a* and 4*b* show the current distribution in a foil winding according to the prior art and according to the invention, respectively.
Figure 4B:
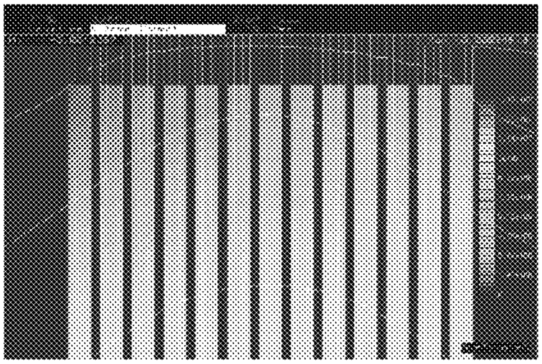

The use of the magnetic material end-fill 9 as described above straightens the leakage flux and consequentially reduce the radial component of it in the region around the end of the foil layers. FIG. 4 shows a possible current distribution in a foil winding without (FIG. 4*a*) and with (FIG. 4*b*) magnetic end-fills at nominal work conditions. As can be noticed, in a foil winding according to the invention the current density concentration in the internal part of the winding is remarkably reduced.

Figure 5A:
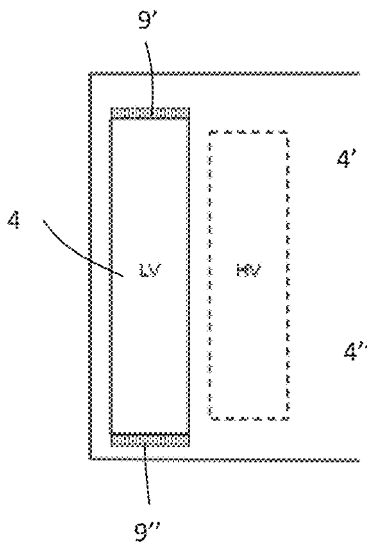
FIGS. 5*a*-5*c* show possible configuration of transformers comprising foil windings according to several embodiments of the invention.
Figure 5B:
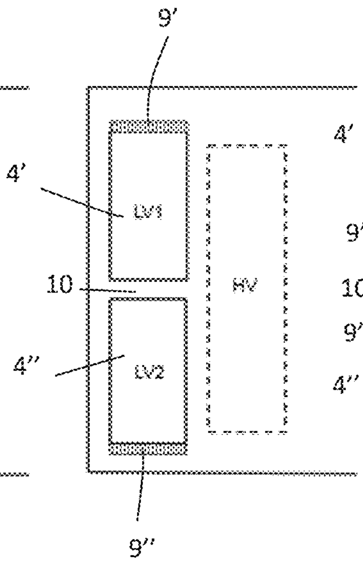
Figure 5C:
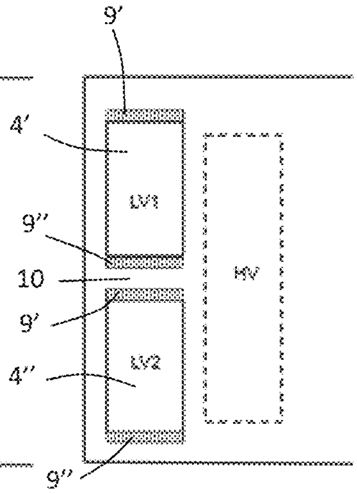

FIGS. 5*a*-5*c* show possible configurations of a transformer including a low voltage (LV) foil winding according to the invention, and a high voltage (HV) winding.

According to an embodiment (FIG. 5*a*), the LV winding comprises a single foil winding 4 having magnetic material end-fills 9' and 9" both at the top and the bottom axial ends.

According to another embodiment (FIG. 5*b*), the LV winding comprises two axially split foil windings 4' and 4" having an axial gap 10 therebetween, wherein the upper foil winding 4' comprises in the top axial end a magnetic material end-fill 9' and the lower foil winding 4" comprises in the bottom end a further magnetic material end-till 9".

According to another embodiment (FIG. 5*c*), the LV winding comprises two axially split foil windings 4' and 4" having an axial gap 10 therebetween, wherein both the upper 4' and the lower 4" foil winding comprise both in the top and in the bottom ends magnetic material end-fills 9' and 9".

It is to be noted that in the present description and in the annexed claims, the terms "upper", "lower", "top", "bottom" are referred to the normal condition of use of the electromagnetic induction device according to the invention, according to what is shown in the Figures.

It is further to be noted that the foil winding 4 according to the invention not necessarily must be used in the LV windings. In general it can be also used in high voltage windings, in medium voltage winding or in tertiary windings. Furthermore, as described above, in the examples of FIGS. 5*a*-5*c* the windings including the magnetic material end-fill are not necessarily of the foil type.

To the above-mentioned embodiments of the electromagnetic induction device according to the invention, the skilled person, in order to meet specific current needs, can make several additions, modifications, or substitutions of elements with other operatively equivalent elements, without however departing from the scope of the appended claims.

The invention claimed is:

1. An electromagnetic induction device comprising a magnetic core having a limb and at least one winding wound around the limb, wherein the winding comprises:

- an electrical conductor forming a plurality of radially overlapping layers around an axis;
- an electrically insulating material positioned between the radially overlapping layers of the electrical conductor;
- at least one magnetic material end-fill positioned at at least one axial end of the winding in electrical contact with the layers of the electrical conductor so to be at the same electrical potential with the latter, wherein the magnetic material end-fill comprises at least one magnetic strip wound around said axis so to form a plurality of radially overlapping layers, each layer of the magnetic strip being positioned in correspondence to and in electrical contact with a respective layer of the electrical conductor;
- at least one electrically insulating material end-fill positioned at said at least one end of the winding, such that the magnetic material end-fill is axially positioned between the electrically insulating material end-fill and the electrical conductor, wherein the electrically insulating material end-fill comprises a pressboard strip wound around said axis so to form a plurality of radially overlapping layers, wherein each layer of the pressboard strip is radially positioned in correspondence to a respective layer of the at least one magnetic strip and to a respective layer of the electrical conductor, wherein the layers of the at least one magnetic strip are axially positioned between the layers of the electrical conductor and the layers of the pressboard strip.

2. The electromagnetic induction device according to claim 1, wherein the at least one wound magnetic strip is in mechanical contact with the electrical conductor.

3. The electromagnetic induction device according to claim 1, wherein the at least one magnetic strip has a same or substantially the same radial thickness as a radial thickness of the electrical conductor.

4. The electromagnetic induction device according to claim 1, wherein the at least one magnetic strip comprises a plurality of radially overlapped magnetic strips.

5. The electromagnetic induction device according to claim 1, wherein the magnetic material forming the magnetic material end-fill is a grain-oriented steel.

6. The electromagnetic induction device according to claim 1, wherein the magnetic material forming the magnetic material end-fill has a relative magnetic permeability greater than 400.

7. The electromagnetic induction device according to claim 1, wherein the electrically insulating material comprises an electrically insulating foil wound around said axis so to form a plurality of radially overlapping layers alternating with the layers of the electrical conductor and with the layers of the magnetic strip.

8. The electromagnetic induction device according to claim 7, wherein said layers of the electrically insulating foil radially alternate with the layers of the electrical conductor, with the layers of the magnetic strip and with the layers of the pressboard strip.

9. The electromagnetic induction device according to claim 7, wherein the electrically insulating foil comprises a diamond paper foil.

10. The electromagnetic induction device according to claim 1, wherein said winding is a foil winding, and wherein said electrical conductor is an electrically conducting foil wound around said axis so to form said plurality of radially overlapping layers.

11. The electromagnetic induction device according to claim 1, wherein the electromagnetic induction device is a transformer.

12. The electromagnetic induction device according to claim 11, wherein the transformer comprises a low voltage (LV) winding and a high voltage (HV) winding, wherein at least one of the LV winding and the HV winding comprises a single winding having magnetic material end-fills both at the top and the bottom axial ends, wherein the upper foil winding comprises in the top axial end a magnetic material end-fill and the lower foil winding comprises in the bottom end a further magnetic material endfill.

13. The electromagnetic induction device according to claim 1, wherein the magnetic material forming the magnetic material end-fill is a non-grain-oriented (NGO) steel.

14. The electromagnetic induction device according to claim 1, wherein the magnetic material forming the magnetic material end-fill is a non-grain-oriented (NGO) steel.

15. The electromagnetic induction device according to claim 11, wherein the transformer comprises a low voltage (LV) winding and a high voltage (HV) winding, wherein at least one of the LV winding and the HV winding comprises two axially split windings having an axial gap therebetween, wherein the upper foil winding comprises in the top axial end a magnetic material end-fill and the lower foil winding comprises in the bottom end a further magnetic material endfill.

16. The electromagnetic induction device according to claim 11, wherein the transformer comprises a low voltage (LV) winding and a high voltage (HV) winding, wherein at least one of the LV winding and the HV winding comprises two axially split windings having an axial gap therebetween, wherein both the upper and the lower foil winding comprise both in the top and in the bottom ends magnetic material end-fills.

* * * * *